Sept. 4, 1956 C. R. KEITH ET AL 2,761,899

APPARATUS FOR RECORDING AND REPRODUCING TELEPHONE MESSAGES

Filed Jan. 14, 1953 16 Sheets-Sheet 1

INVENTORS C. R. KEITH
C. A. NICKERSON
BY

ATTORNEY

APPARATUS FOR RECORDING AND REPRODUCING TELEPHONE MESSAGES

Filed Jan. 14, 1953 16 Sheets-Sheet 2

INVENTORS C. R. KEITH
C. A. NICKERSON
BY V. P. Priolo
ATTORNEY

Sept. 4, 1956 C. R. KEITH ET AL 2,761,899

APPARATUS FOR RECORDING AND REPRODUCING TELEPHONE MESSAGES

Filed Jan. 14, 1953 16 Sheets-Sheet 3

INVENTORS C. R. KEITH
C. A. NICKERSON
BY V. P. Priolo

ATTORNEY

APPARATUS FOR RECORDING AND REPRODUCING TELEPHONE MESSAGES

Filed Jan. 14, 1953 16 Sheets-Sheet 4

INVENTORS C. R. KEITH
C. A. NICKERSON
BY V. P. Priolo
ATTORNEY

APPARATUS FOR RECORDING AND REPRODUCING TELEPHONE MESSAGES

Filed Jan. 14, 1953 16 Sheets-Sheet 5

INVENTORS C. R. KEITH
C. A. NICKERSON
BY V. P. Priolo
ATTORNEY

APPARATUS FOR RECORDING AND REPRODUCING TELEPHONE MESSAGES

Filed Jan. 14, 1953 16 Sheets-Sheet 6

INVENTORS C. R. KEITH
C. A. NICKERSON
BY V. P. Priolo
ATTORNEY

INVENTORS C. R. KEITH
C. A. NICKERSON
BY V. P. Priolo
ATTORNEY

INVENTORS C. R. KEITH
C. A. NICKERSON
BY V. P. Priolo
ATTORNEY

INVENTORS C. R. KEITH
C. A. NICKERSON
BY V. P. Priolo
ATTORNEY

APPARATUS FOR RECORDING AND REPRODUCING TELEPHONE MESSAGES

Filed Jan. 14, 1953. 16 Sheets-Sheet 10

INVENTORS C. R. KEITH
C. A. NICKERSON
BY V. P. Priolo

ATTORNEY

INVENTORS C. R. KEITH
C. A. NICKERSON
BY V. P. Priolo
ATTORNEY

INVENTORS C.R.KEITH
C.A.NICKERSON
BY V.P. Priolo
ATTORNEY

INVENTORS C. R. KEITH
C. A. NICKERSON
BY V. P. Prisco
ATTORNEY

Sept. 4, 1956 C. R. KEITH ET AL 2,761,899

APPARATUS FOR RECORDING AND REPRODUCING TELEPHONE MESSAGES

Filed Jan. 14, 1953 16 Sheets-Sheet 14

INVENTORS C. R. KEITH
C. A. NICKERSON

BY V. P. Piriolo

ATTORNEY

APPARATUS FOR RECORDING AND REPRODUCING TELEPHONE MESSAGES

Filed Jan. 14, 1953 16 Sheets-Sheet 15

INVENTORS C. R. KEITH
C. A. NICKERSON
BY

ATTORNEY

Sept. 4, 1956 C. R. KEITH ET AL 2,761,899

APPARATUS FOR RECORDING AND REPRODUCING TELEPHONE MESSAGES

Filed Jan. 14, 1953 16 Sheets-Sheet 16

INVENTORS C. R. KEITH
C. A. NICKERSON
BY V. P. Driolo
ATTORNEY

United States Patent Office 2,761,899

Patented Sept. 4, 1956

2,761,899

APPARATUS FOR RECORDING AND REPRODUCING TELEPHONE MESSAGES

Clyde R. Keith, Maplewood, and Clifford A. Nickerson, Bernardsville, N. J., assignors to Bell Telephone Laboratories, Incorporated, New York, N. Y., a corporation of New York Application January 14, 1953, Serial No. 331,157

10 Claims. (Cl. 179—6)

This invention relates to sound recording and reproducing apparatus for use with telephone systems, and particularly to a combination of elements which results in an effective form of device adapted to be connected to a subscriber's telephone line for the purpose of automatically receiving and transmitting messages during the absence of the subscriber.

The object of this invention is to provide an automatic answering and recording device which is economical and efficient in operation, which may be located on the telephone subscriber's premises, and by means of which incoming telephone signals may be automactially answered, a message may be reproduced and transmitted to the calling party, an incoming message may be received and recorded and said transmitted and received messages may be reproduced for the subscriber.

In accordance with this invention the above-noted objective is satisfactorily met by a unitary device suitable for use on a desk or table, the general features of which include the utilization of magnetic recording for both the talk-out (transmitted) and talk-in (received) messages. These messages are recorded on individual talk-out and talk-in drums mounted on the same shaft but not connected directly to it. In a preferred embodiment of this invention the drums are made of a material such as aluminum on the peripheral face of which is mounted, under radial tension, a flexible, radially extensible, magnetizable band of the type disclosed in patent application Serial No. 120,396 filed on October 8, 1949.

Each drum is provided with an electromagnetic transducer which is traversed axially along the surface of the magnetizable band or record medium by means of a half-nut which engages a lead screw, causing a helical track to be laid down on the medium. In order to ensure that the track be retraced, the lead screw is driven by the drum through constantly meshed gears which guarantee the maintenance of the orientation of the drum with respect to the lead screw.

The shaft for the drum is driven by a motor by means of a double set of pulleys through two belts preferably made of fabric. The two drums are assembled on this shaft on bearings contained in the drum and each drum is driven from the shaft by means of a constant torque clutch, the collar of which is fixedly attached to the rotating shaft and the plate of which comprises a compliant member which is in constant frictional engagement with the drum. The combination of the driving belts and the compliant clutch member constitutes a compliant system which minimizes any flutter which may be present in the drums. This arrangement, which constitutes a specific feature of the present invention, also permits the driving of either drum separately and is utilized to hold the talk-in drum stationary during both the record and reproduce talk-out cycles and to hold the talk-out drum stationary during both the record and reproduce talk-in cycles. Rotation of the drums is prevented by means of a pawl which falls into a notch in the drum.

Means are provided for changing from reproducing the talk-out message to recording the talk-in message immediately at the end of the talk-out message rather than at the end of a specified time. Provision is also made to stop the talk-in drum shortly after the calling party hangs up if this occurs before the end of the maximum talk-in message period. This not only permits the recording of more messages on a drum of given dimensions, but avoids the blank recording space which the subscriber would have to transverse when playing back messages.

Sixty-cycle bulk neutralization erase is used on both drums. The method employed is essentially the same as the method disclosed in patent application Serial No. 250,860 filed on October 11, 1951.

The nature of the invention and its distinguishing features and advantages will be more clearly understood from the following detailed description and the accompanying drawings in which.

Figure 1:
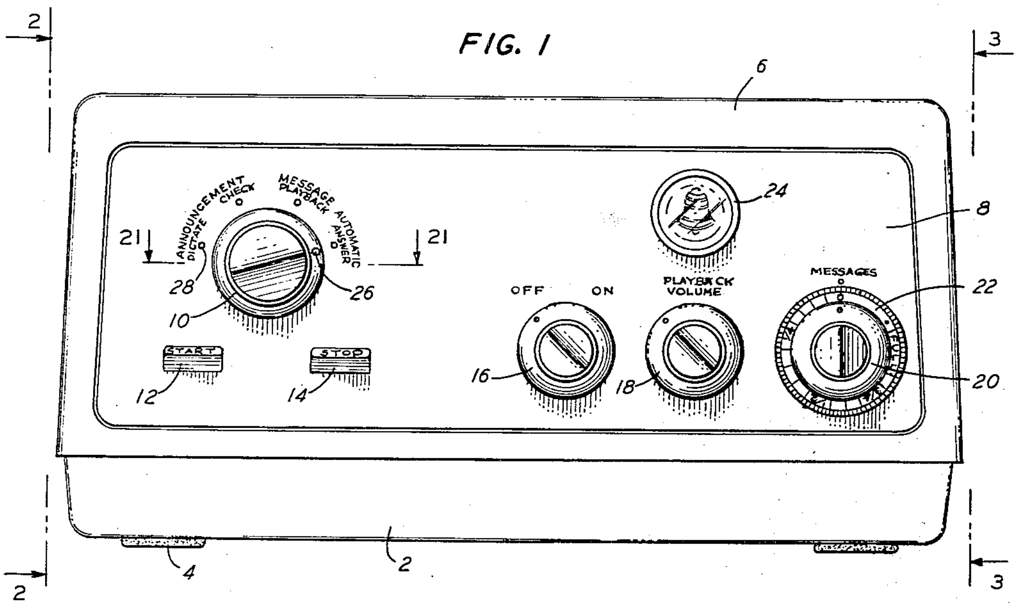
Fig. 1 is a view in front elevation of an embodiment of the present invention, the components of which are disposed in a cabinet comprising a base, a front panel, and a cover.
Figure 27:
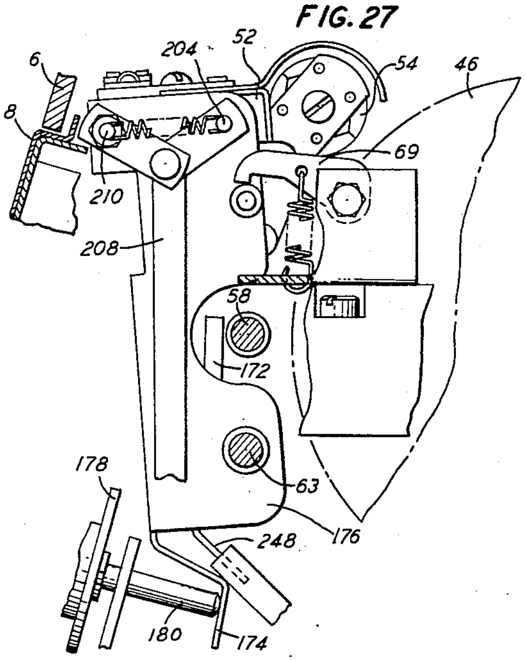
Fig. 27 is a fragmentary view showing the talk-in carriage mechanism in Fig. 8 disengaged from the lead screw by the scanning knob.
Figure 21:
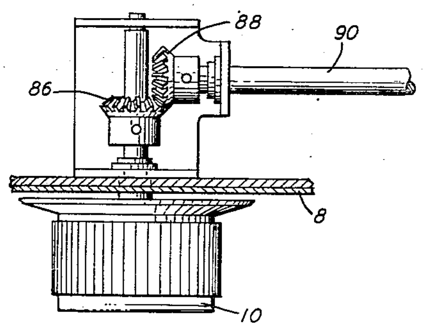
Fig. 21 is a sectional view taken on the line 21—21 of Fig. 1 showing the function knob drive.
Figure 2:
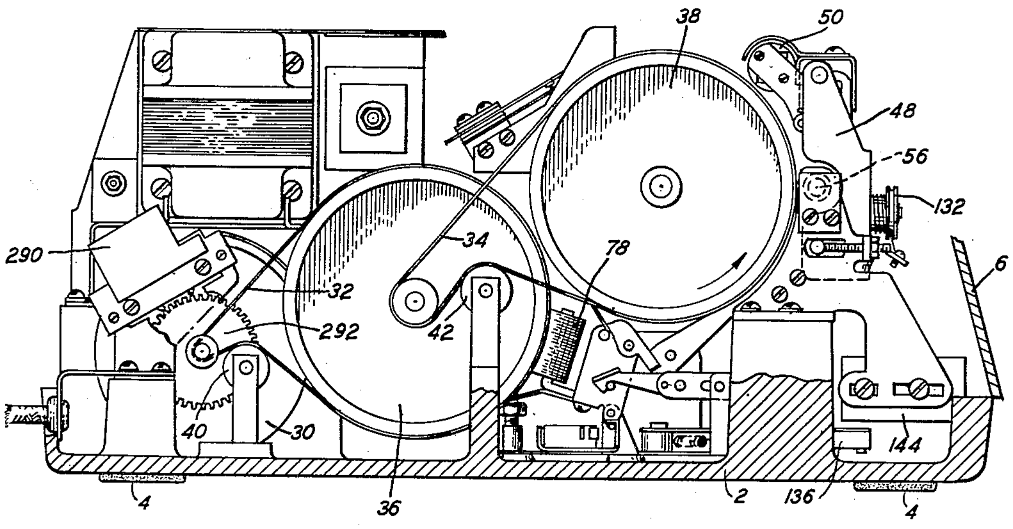
Fig. 2 is a view in side elevation taken on the line 2—2 of Fig. 1 shown partially in section, with the cover and front panel broken away.
Figure 3:
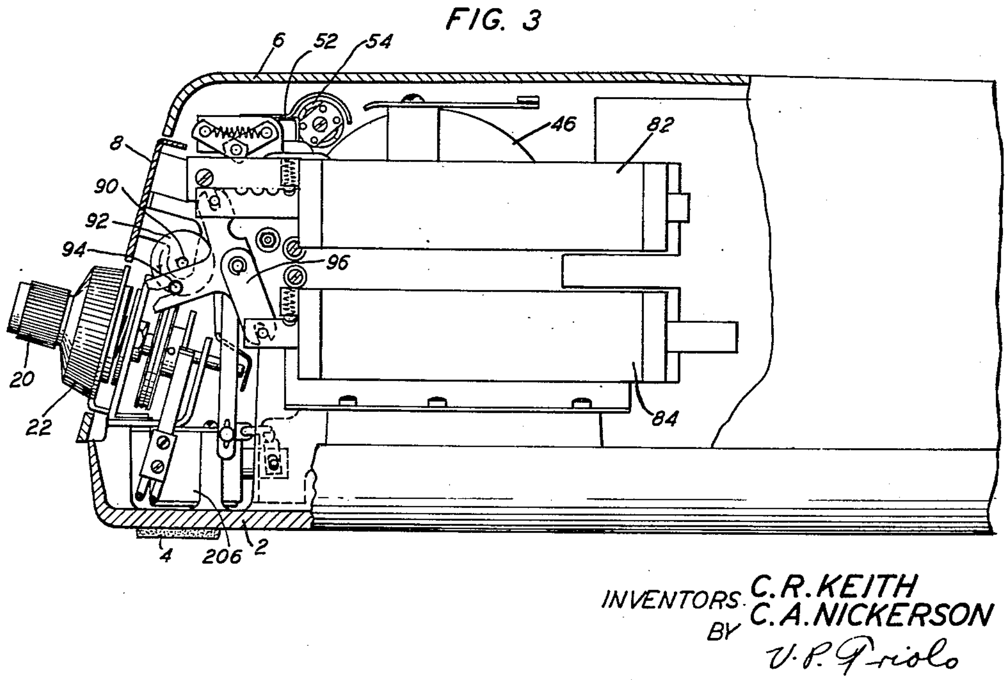
Fig. 3 is a view in side elevation taken on the line 3—3 of Fig. 1 shown partially in section.
Figure 4:
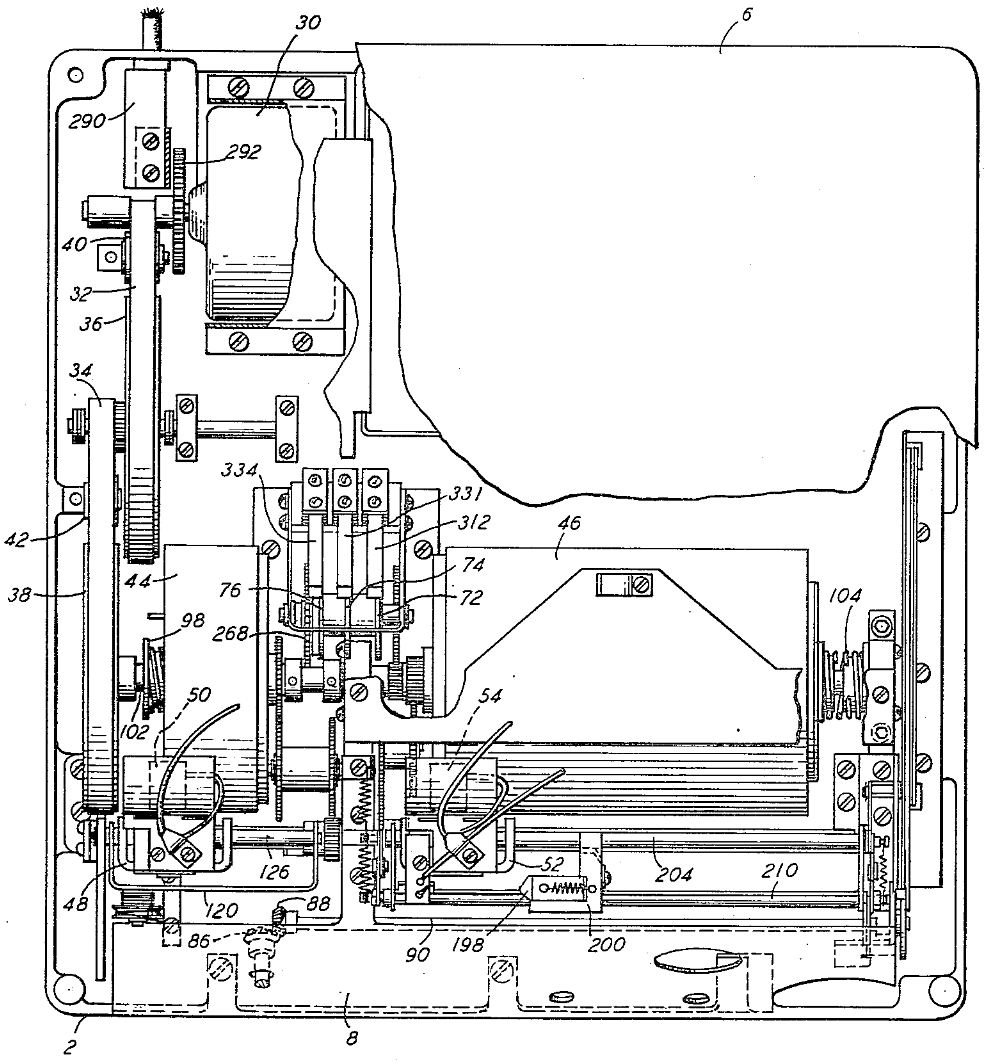
Fig. 4 is a plan view of the embodiment shown in Fig. 1 with the cover broken away and the front panel removed.
Figure 5:
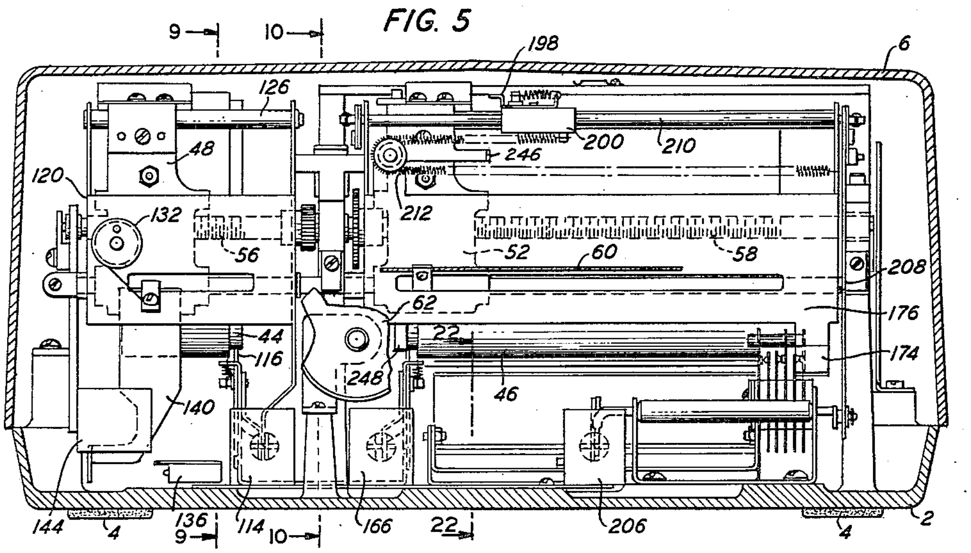
Fig. 5 is a view in front elevation of the embodiment shown in Fig. 1 with the cover broken away and the front panel removed.
Figure 6:
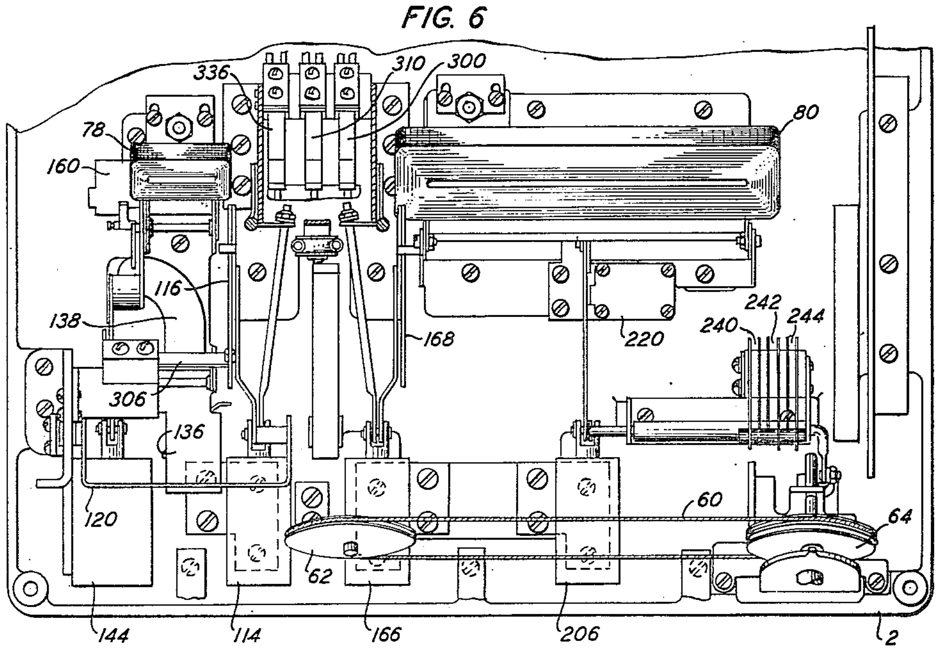
Fig. 6 is a plan view of the embodiment shown in Fig. 1 with the cover, front panel, talk-out drum, talk-in drum and transducer carriages removed.

As shown in Fig. 1, the entire mechanism of the present invention is enclosed in a metal cabinet, the base 2 of which is equipped with felt covered feet 4, for use on a desk or table, and the cover 6 of which is attached to the base in a conventional manner. The subscriber-operated controls are all mounted on the front panel 8 which is part of the base assembly. These controls consist of the four-position function switch knob 10, start key 12, stop key 14, on-off switch 16, playback volume control 18, message scanning knob 20 and indicator dial 22. In addition there are three indicating lights: the on-off light 24, the ready light 26 and the dictate light 28.

The mechanical components enclosed within the cabinet 2 as shown in Figs. 2, 3, 4, 5, 6 and 18 are principally a motor 30, a belt drive comprising the endless belts 32 and 34, the pulleys 36 and 38 and the idler pulleys 40 and 42; the talk-out recording drum 44, the talk-in recording drum 46, the talk-out transducer carriage 48 and transducer 50; the talk-in transducer carriage 52 and transducer 54; the talk-out lead screw 56, the talk-in lead screw 58 (Fig. 8); the manual scanning and indicating means comprising the flexible cable 60 and pulleys 62 and 64 which connect the transducer carriage 52 to the message scanning knob 20; the timing cams 66, 68 and 70, which are related to the talk-out drum, timing cams 72, 74 and 76, which are related to the talk-in drum; the talk-out erase coil 78, the talk-in erase coil 80; the slide switches 82 and 84 which are manipulated by means of the function switch knob 10, the gear 86 on the function knob shaft, the gear 88 on the rod 90, the plate 92 on rod 90, the pin 94 on plate 92 and the pivoted T arm 96 to change from one function to another; the constant torque clutch 98 comprising the collar 99 which is rotated continuously by the shaft 102 to which it is keyed, the plate 100 which is slidably attached to the collar 99 by means of the pin 101 and the compliant member 103, preferably a felt ring disposed on the plate 100, which frictionally engages the talk-out drum 44; and the constant torque clutch 104 which is similar to the clutch 98 and frictionally engages the talk-in drum 46.

Figures 7, 18:
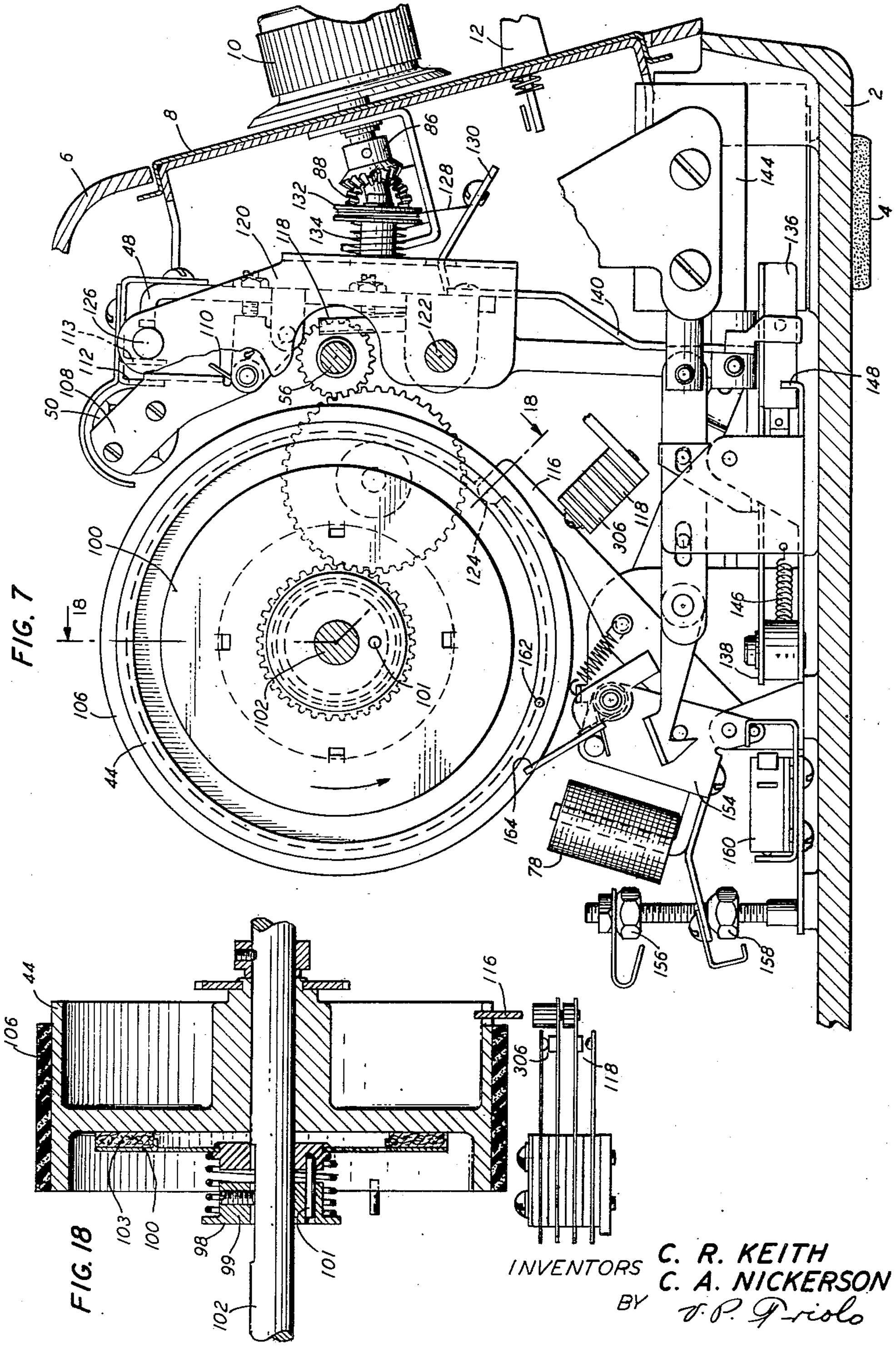
Fig. 7 is a view similar to that shown in Fig. 2 with the components disclosed in greater detail and with the driving elements removed.
Fig. 18 is a sectional view taken on the line 18—18 of Fig. 7 showing the clutch mechanism for the talk-out drum.
Figure 8:
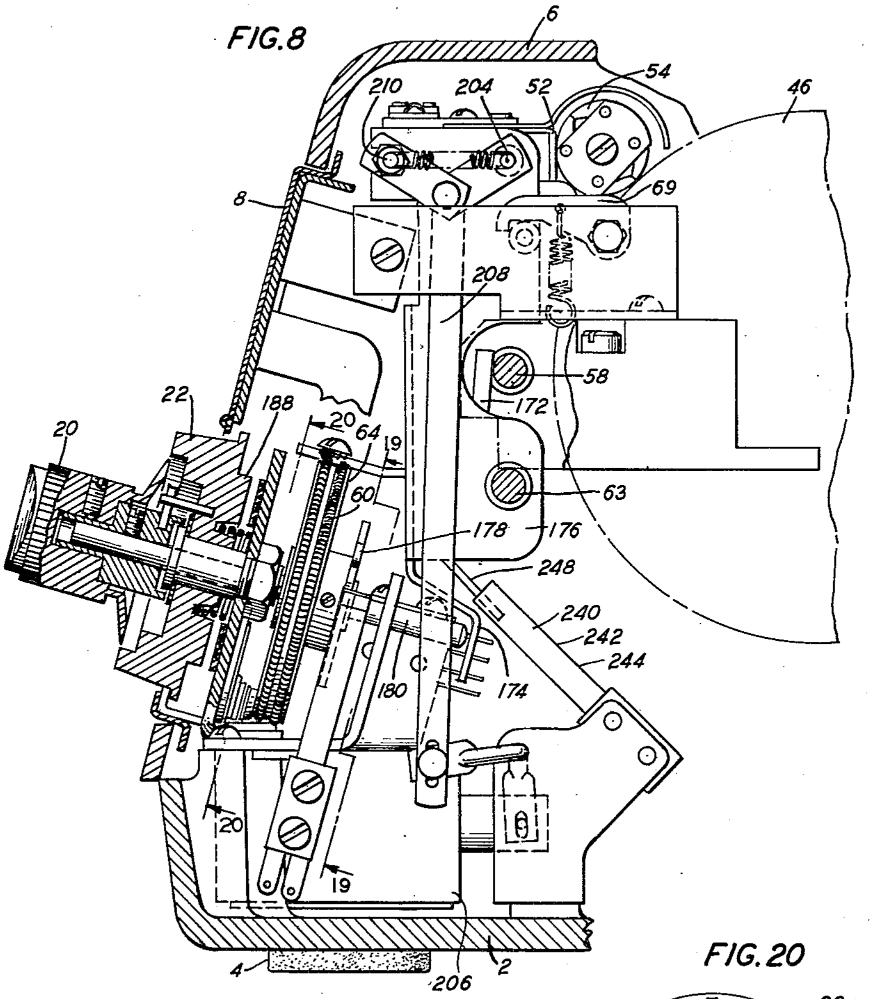
Fig. 8 is a view similar to that shown in Fig. 3 with the components disclosed in greater detail.
Figure 19:
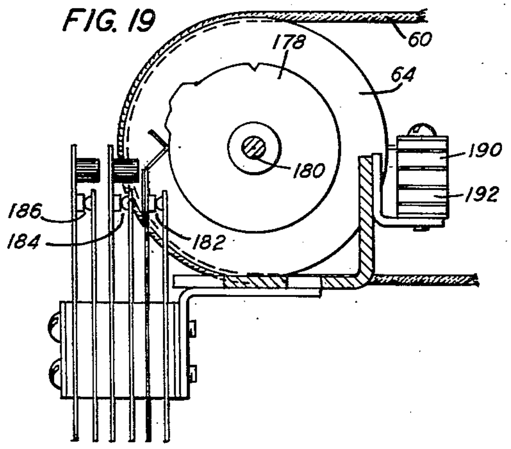
Fig. 19 is a sectional view taken on the line 19—19 of Fig. 8.
Figure 20:
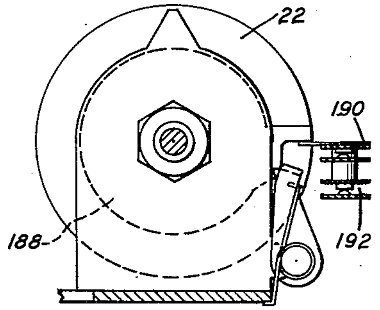
Fig. 20 is a sectional view taken on the line 20—20 of Fig. 8.
Figure 9:
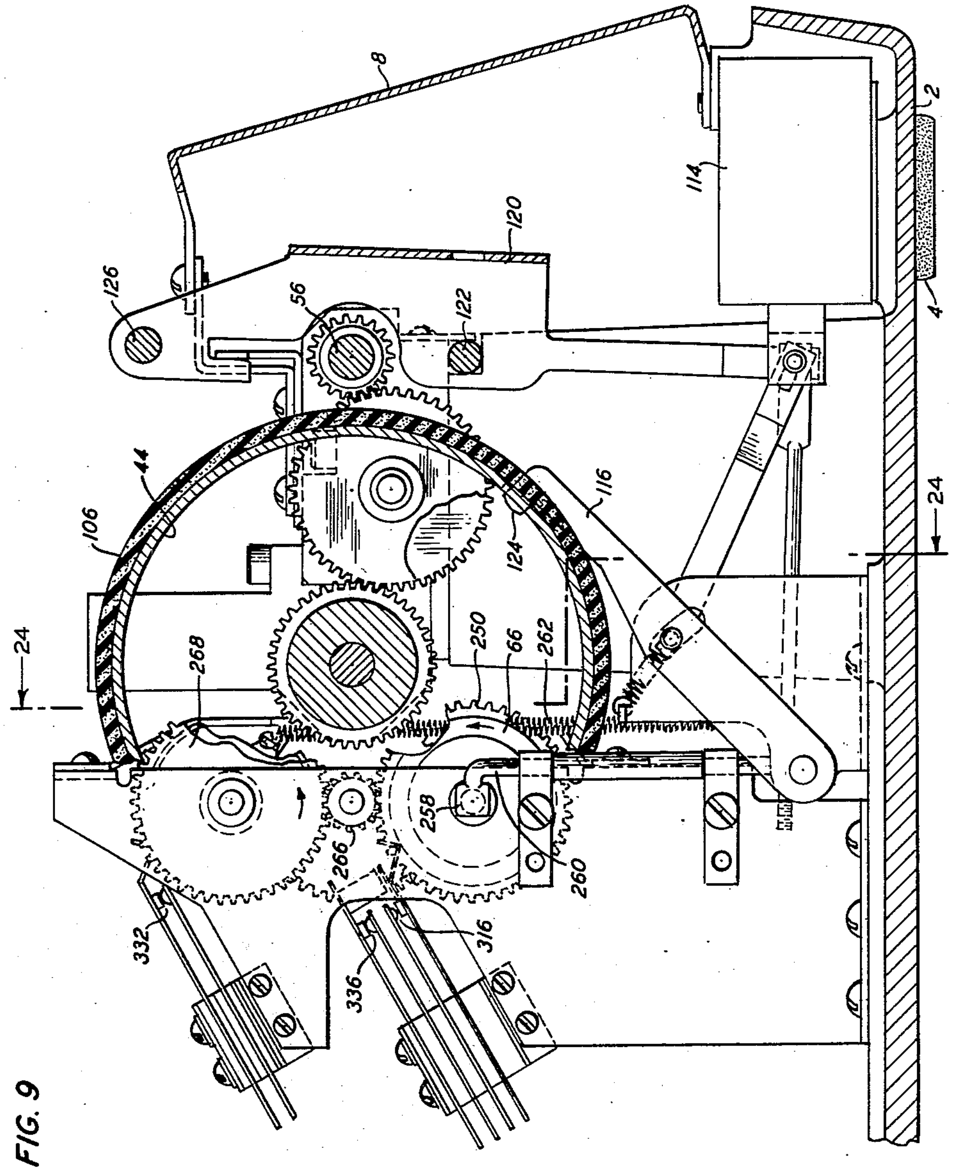
Fig. 9 is a sectional view taken on the line 9—9 of Fig. 5.

The smaller drum 44 which is used for recording and reproducing the "announcement" or outgoing message is arranged to rotate once in about three seconds. As it rotates, the lead screw 56 moves the transducer 50 across the width of the magnetizable band 106 tracing a helical track with 0.10-inch spacing between track centers. A thirty-second message therefore requires ten revolutions or one inch in width. The transducer 50, which is held in contact with the surface of the magnetizable band during the recording and reproducing operations is mounted on a pivoted arm 108 with a spiral spring 110 applying about 20 to 25 grams pressure between the transducer 50 and the magnetizable band 106. The free motion of the arm 108 which permits the transducer 50 to ride continuously on the surface of the magnetizable band despite any imperfections or eccentricities in the band, is controlled by the spring 110 and the stops 112 and 113. When the solenoid 114 is not operated, the pawl 116 stops rotation of the drum 44, the half-nut 118 is disengaged from the lead screw 56 and the transducer 50 is removed from contact with the magnetizable band, as shown in Figs. 7 and 9. When the solenoid 114 is energized the bail 120 is rotated on the guide bar 122 as a pivot so that the pawl 116 is disengaged from the slot 124 in drum 44, allowing the drum to rotate, the half-nut 118 is engaged with the lead screw 56 and the transducer 50 is allowed to come in contact with the band 44.

The transducer carriage 48 is supported by and slides along the bars 122 and 126 which are mounted within the bail 120. The half-nut 118 is a component of the transducer carriage. As the transducer carriage 48 moves from its zero position (from left to right) a cord 128 attached to an arm 130 of the carriage rotates a pulley 132 which winds up a spiral spring 134. When the half-nut is disengaged from the lead screw, this spring pulls the carriage back to its zero position. By causing the drum to stop always in the same position, the transducer always retraces the same track on the magnetizable band. The drum 44 is stopped in a given "index" position by providing a single slot 124 into which the stopping pawl 116 can rest. A switch 119 held closed until the pawl is seated provides a circuit to keep the driving motor running until the drum stops in the required position.

Figure 16:
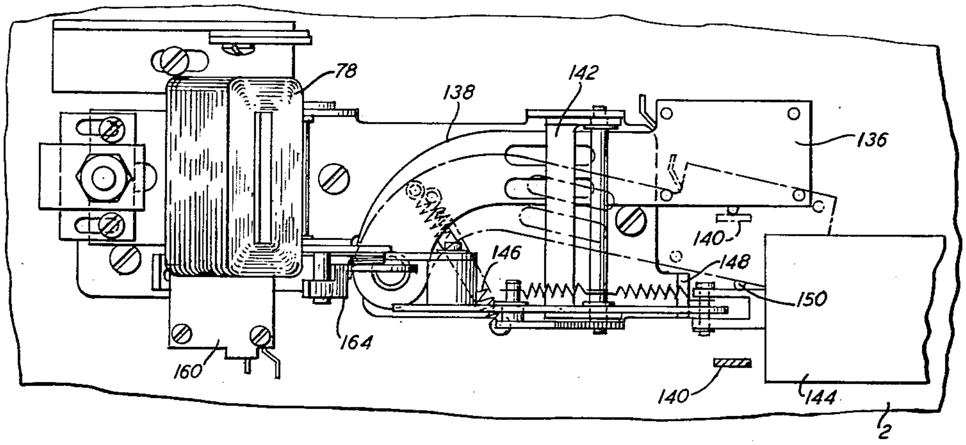
Fig. 16 is a plan view of the erase coil shown in Fig. 15.

Provision is made for recording and reproducing outgoing messages of any length from 12 to 30 seconds without "dead" time between the end of this message and the beginning of the recording of the incoming message. This is accomplished by means of an adjustable limit switch 136 which is automatically positioned at the end of the travel of the carriage 48. A pivoted arm 138 (Fig. 16) carries switch 136 which is operated by an arm 140 which moves with the carriage 48. A friction pad 142 is arranged so that it normally presses against the arm 138 carrying the switch, holding the switch in a fixed position. When the machine is running with the function switch knob in the "announcement-dictate" position, the solenoid 144 releases the friction pad 142 and and allows the switch arm 138 to take up a new position. Since the spring 146 pulls the switch arm 138 toward the zero position the first effect when the friction pad is released is for the switch arm to return to a stop 148 near the zero position. It does not go back to zero because there is provided a minimum outgoing message time of 10 to 15 seconds. When the outgoing message time is greater than the specified minimum time, and the carriage reaches this position, the carriage arm 140 pushes against the switch operating pin 150, moving the switch and arm but not operating the switch. When the subscriber has finished dictating his outgoing message and presses the "stop" key, the solenoid 144 is released, allowing the friction pad to be pressed against the switch arm. This holds the arm and switch in this position for all subsequent operations until a new outgoing message is recorded. Consequently, when the outgoing message is reproduced, the carriage progresses to the end of the message, then the carriage arm operates switch 136 releasing the solenoid 114, and causing the carriage to return to zero. Operation of switch 136 also starts the incoming message drum and operates relays which make the necessary changes in connections for recording incoming messages.

Figure 15:
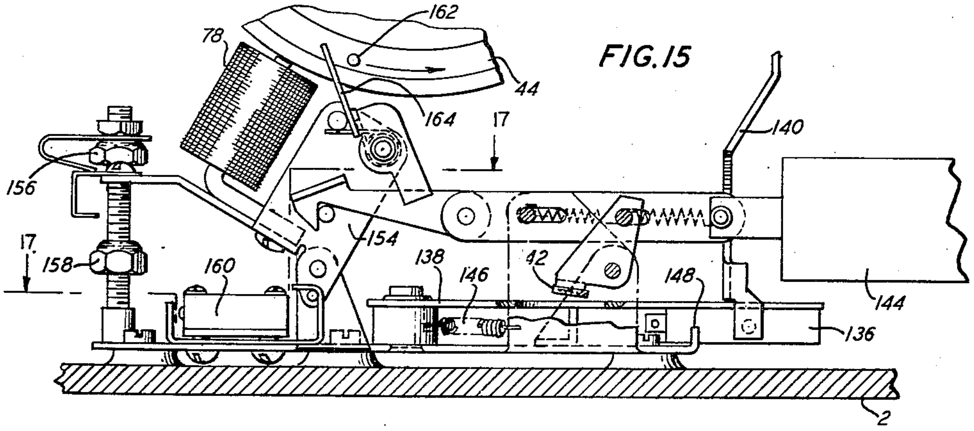
Fig. 15 is a detail view in the operated position of the talk-out erase coil mechanism shown in Fig. 7.
Figure 17:
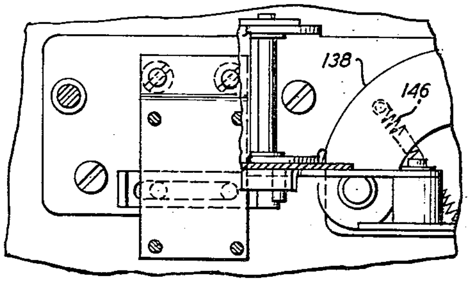
Fig. 17 is a sectional view taken on the line 17—17 of Fig. 15.
Figure 26:
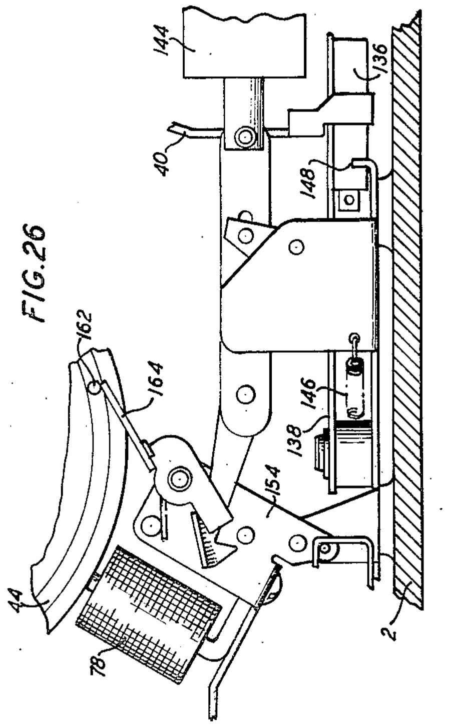
Fig. 26 is a view similar to the view in Fig. 15 with the latch mechanism operated by the pin on the talk-out drum after the erase cycle has been completed.
Figure 24:
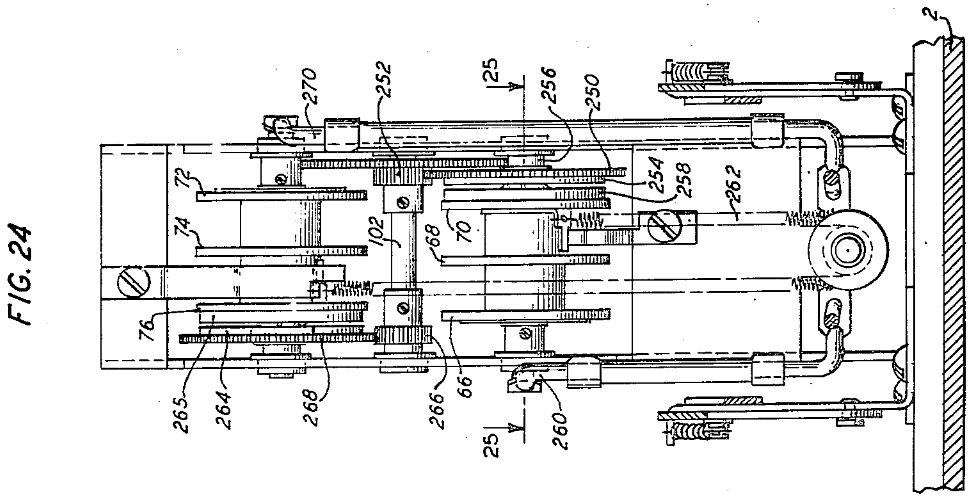
Fig. 24 is a sectional view taken on the line 24—24 of Fig. 9 showing the timing cams and the wind-up return spring therefor.
Figure 28:
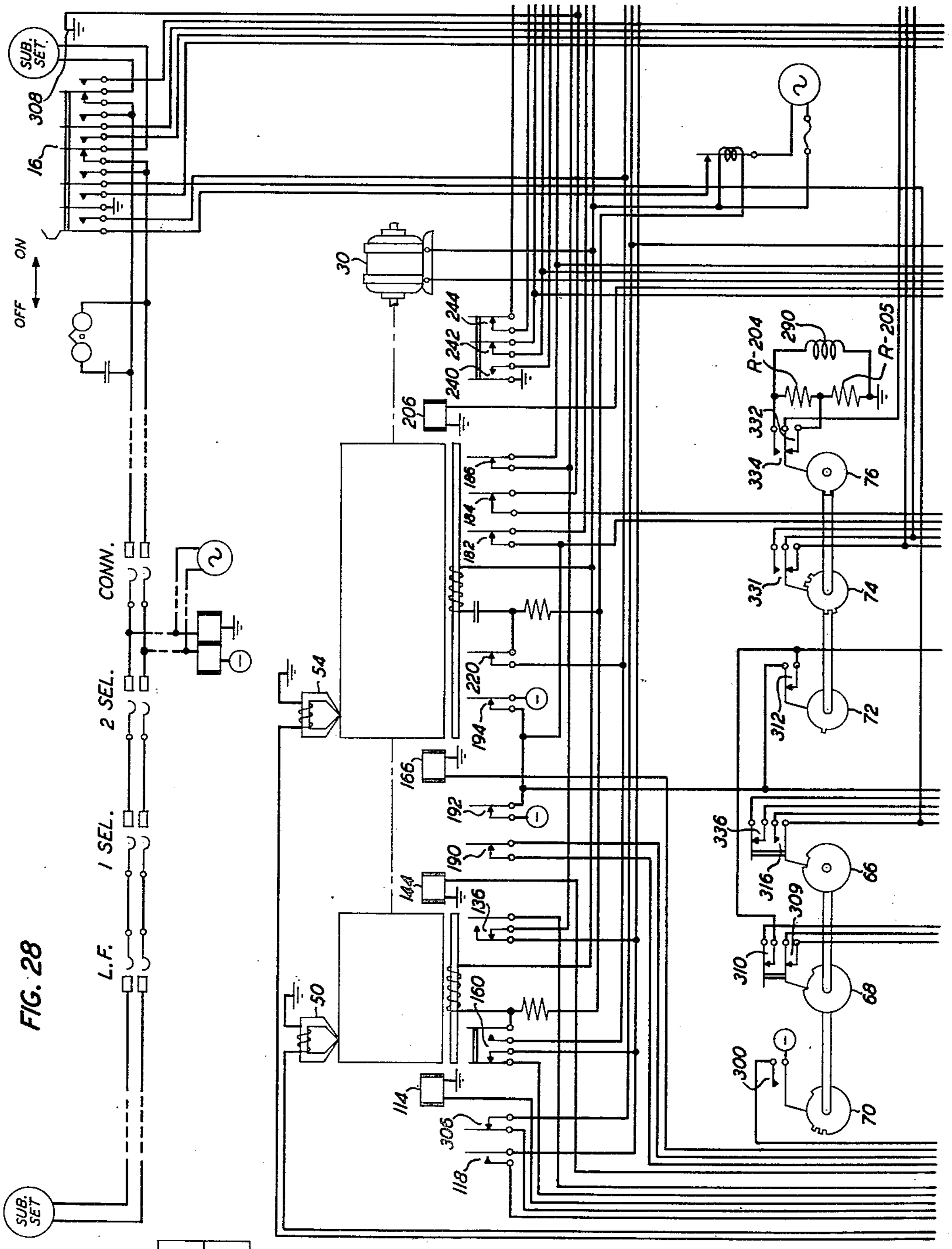
Figs. 28, 29, 30 and 31 when assembled as indicated in Fig. 32 constitute a diagrammatic disclosure of the electrical and mechanical controls for the present invention.
Figure 32:
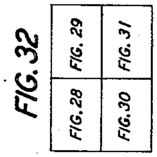
Figure 29:
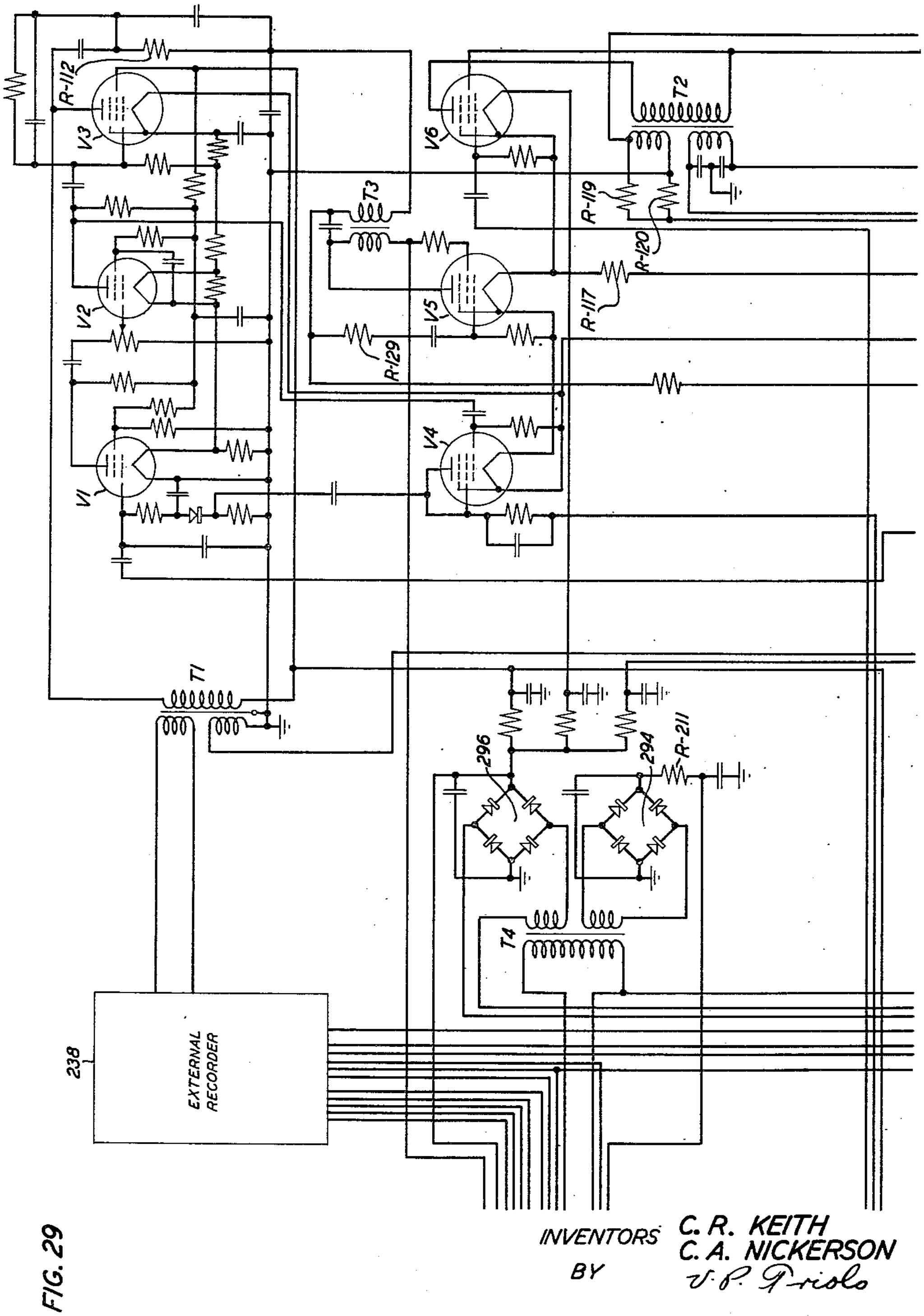

Before a new outgoing message is recorded, the previous one must be erased. This is accomplished by means of an iron core coil 78 which is energized by 60-cycle current and held near the drum 44 for one revolution. The core has a face approximately the length of the record area on the drum so that the entire helical track is erased in one revolution. The erase coil is mounted on a pivoted arm 154 and the stops 156 and 158 are so arranged that the core comes within 0.020 inch of the magnetizable band 106 when erasing but is about 0.4 inch from the band when not in use. This latter distance is to prevent residual magnetization of the band when the erasing current is turned off by switch 160 which is operated just before the coil reaches its rest position. The erase coil is moved to its operating position by the same solenoid 144, which releases the arm 138 holding the adjustable limit switch 136. However, since switch 136 must be released during the entire time of recording the outgoing message but the erase coil is to be operated for only one revolution, the latter is mechanically released by the pin 162 on drum 44. This pin, after one revolution, engages the latch 164 (Figs. 15 and 26) which releases the erase coil 152 while solenoid 144 remains energized. Pin 162 is located so that it does not engage the release latch 164 after the first revolution. The latch 164 assumes its original position, under the pressure of a spiral spring, after it is released by the pin 162.

Figure 10:
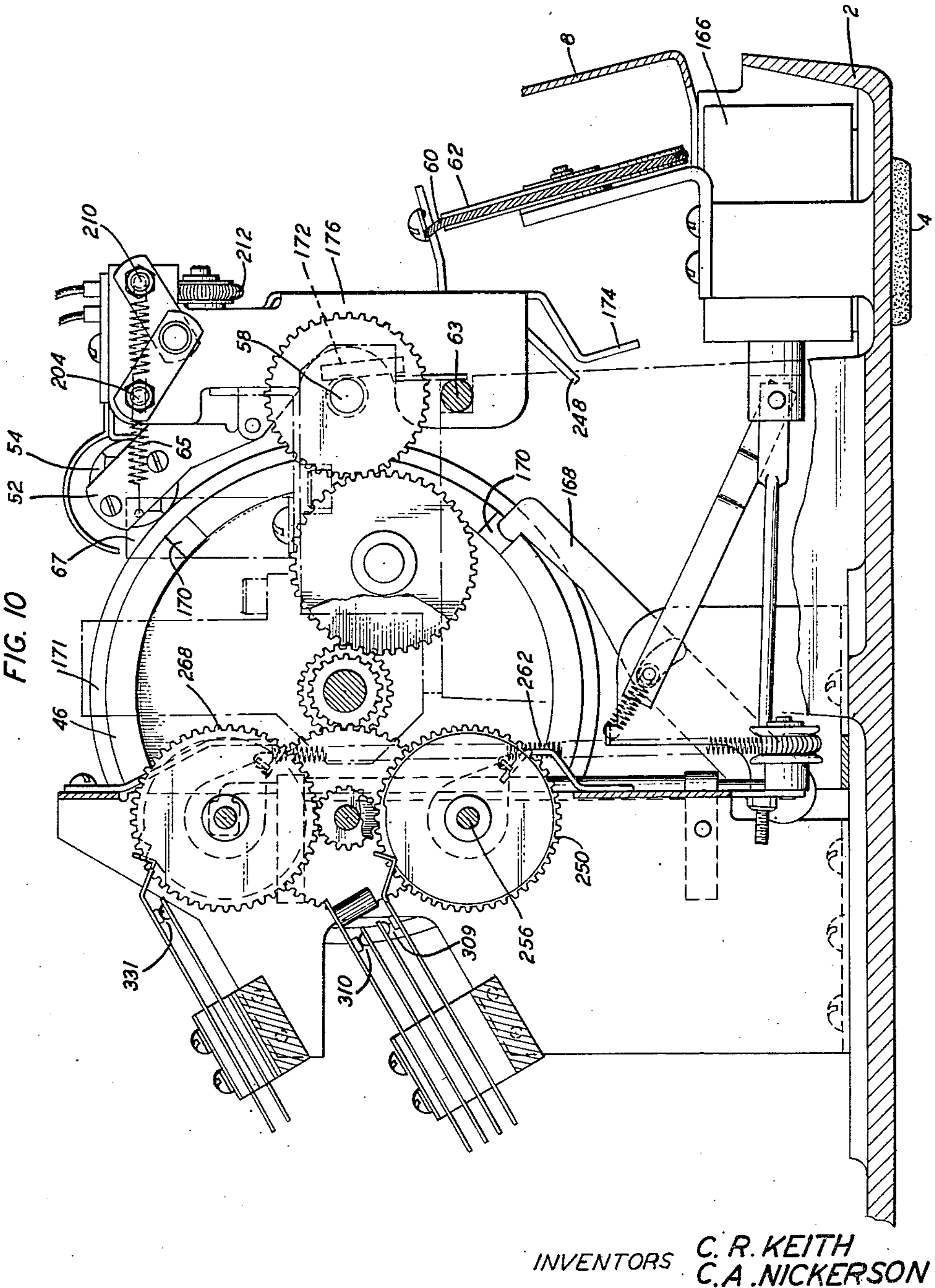
Fig. 10 is a sectional view taken on the line 10—10 of Fig. 5.
Figure 14:
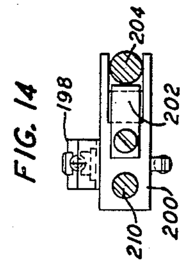
Fig. 14 is a sectional view taken on the line 14—14 of Fig. 11.
Figure 13:
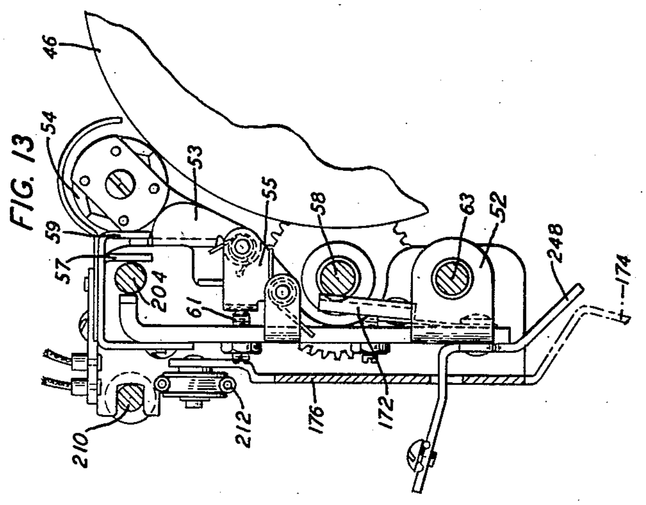
Fig. 13 is a sectional view taken on the line 13—13 of Fig. 11.
Figure 11:
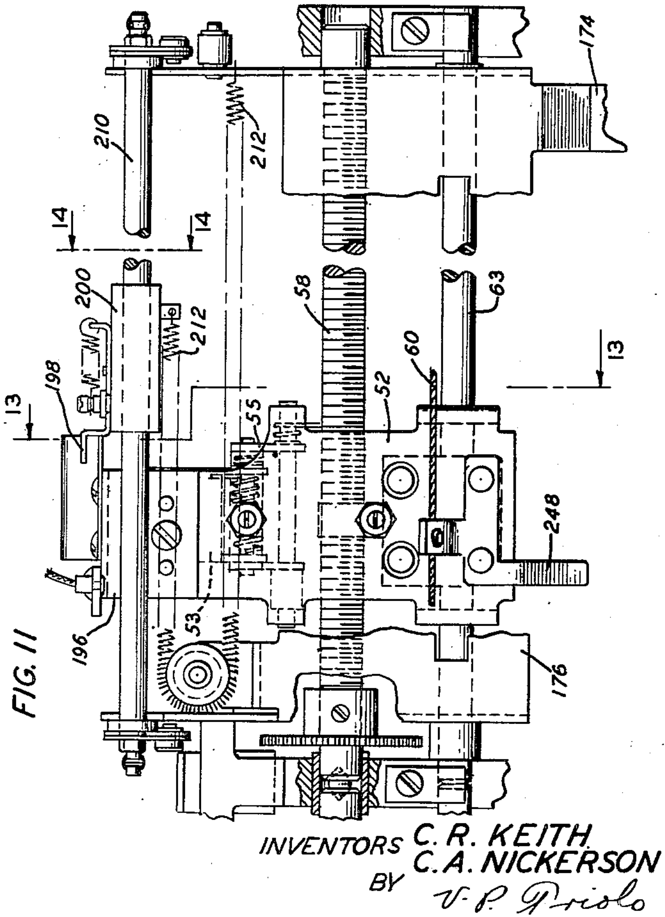
Fig. 11 is a detail view of the talk-in transducer carriage mechanism shown in Fig. 5.

The larger drum 46, on which incoming messages are recorded, is driven by a continuously rotating clutch 104 similar to that used on the talk-out drum 44 but located at the opposite end, away from the drive pulley 38. Rotation of drum 46 is controlled by the solenoid 166 and pawl 168 (Fig. 10). There are four slots 170 in drum 46 in which the pawl can engage to stop the drum. The four slot arrangement is satisfactory since it is not necessary to stop drum 46 in the same position. As drum 46 rotates it turns the associated lead screw 58 through a gear reduction which provides a track spacing of 0.025 inch, center to center on the magnetizable band 171. The maximum time available for individual talk-in messages is 30 seconds and a total of 10 minutes of recording space is available for recording these messages on drum 46. The transducer 54 is mounted on carriage 52 by means of the spring tensioned pivoted arm 53 and the spring tensioned pivoted bracket 55, with the half-nut 172 adapted to engage the lead screw 58. The pivotal motion of the arm 53 is limited by the stops 57 and 59. The screw 61 is employed to adjust the position of bracket 55 which in turn adjusts the position of arm 53 to provide the required tangency relationship between the transducer and the magnetizable band. The carriage 52 is supported by the slides along the guide bar 63 on which the bail 176 pivots. When the talk-in unit is in condition to receive messages the half-nut 172 is held in engagement with the lead screw 58 by means of the spring member 65 which is attached to the bail 176 and the anchor arm 67. The spring tensioned pivoted arm 69 is employed to dampen any vibratory motion of the bail 176. The stop 57 is also employed to support and guide the carriage 52 along the slide bar 204. There is no provision for automatic return of the carriage 52. Instead carriage 52 is connected by means of the flexible cable 60 and pulleys 62 and 64 (Figs. 6 and 11) to the message scanning knob 20 (Fig. 8) which appears on the front panel. Knob 20 rotates as carriage 52 is moved by lead screw 58 and shows the position of transducer 54. When playing back messages this knob is used for manually moving transducer 54 to any desired part of drum 46 to pick out any message or to repeat a message. Before this can be done it is necessary to disengage the half-nut 172 from lead screw 58, which is done by pushing in on the scanning knob 20. This engages the arm 174 on the bail 176 on which carriage 52 is mounted, moving it enough to release the half-nut 172. This motion, however, is not enough to affect the cable 60 running on the pulleys 62 and 64. A cam 178 is mounted on the scanning knob shaft 180 to operate switches 182, 184, and 186. The functions of these switches, which are operated in sequence, will be described hereinafter. Another cam 188 on the same shaft but connected to the indicator dial 22 operates switches 190 and 192 which control mechanism for erasing incoming messages.

Figure 12:
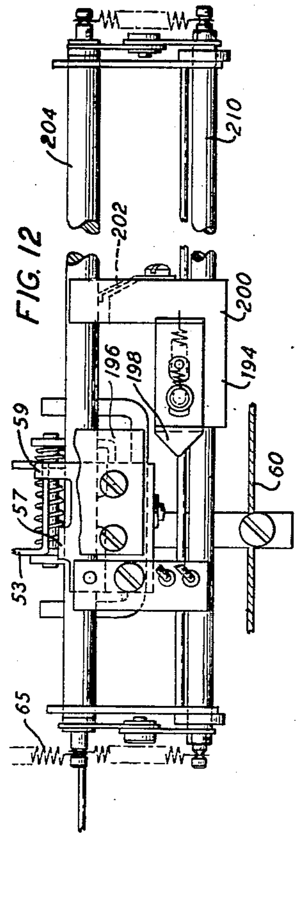
Fig. 12 is a plan view of the carriage mechanism shown in Fig. 11.

The talk-in unit is also equipped with a switch 194 (Figs. 11 and 12) which prevents recording over a portion of the drum already used but not erased. This switch consists of two parts, the fixed contacts located on the insulator 196 attached to the transducer carriage 52 and the shorting contact 198 mounted on the switch carriage 200. Switch carriage 200 has a locking spring 202 normally pressed against the slide bar 204 on the bail 176 with sufficient friction to hold it in position but not enough to keep the transducer carriage 52 from pushing it ahead during the recording of messages. When the machine is set for answering an incoming call with the talk-in transducer 54 at the beginning of the transducer carriage travel, the switch carriage 200 is released by means of the solenoid 206, which also controls the operation of the talk-in erase coil as will be explained hereinafter before the first message is recorded. The release of switch carriage 200 is accomplished when the solenoid 206 actuates the arm 208 which in turn moves the slide bar 210 away from slide bar 204. When released, switch carriage 200 is pulled to the zero position by means of the coil spring 212 and closes the circuit between the fixed contacts on insulator 196 by means of contact 198. These contacts remain closed during the recording of incoming messages but are opened when the carriage is moved manually for scanning messages.

The indicator dial 22 is provided to show the maximum extent of recording on the talk-in drum 46. This is useful in case a relatively small proportion of the drum is used and the subscriber wishes to set the machine for recording additional messages without erasing those already recorded, although he may have played back one or more of the messages on the drum. The dial 22 is mounted between the front panel 8 and the message scanning knob 20 and is rotated by knob 20 during recording. However, it remains in position when the scanning knob 20 is turned for playing back messages and must be manually returned to zero before incoming messages can be erased.

Figure 22:
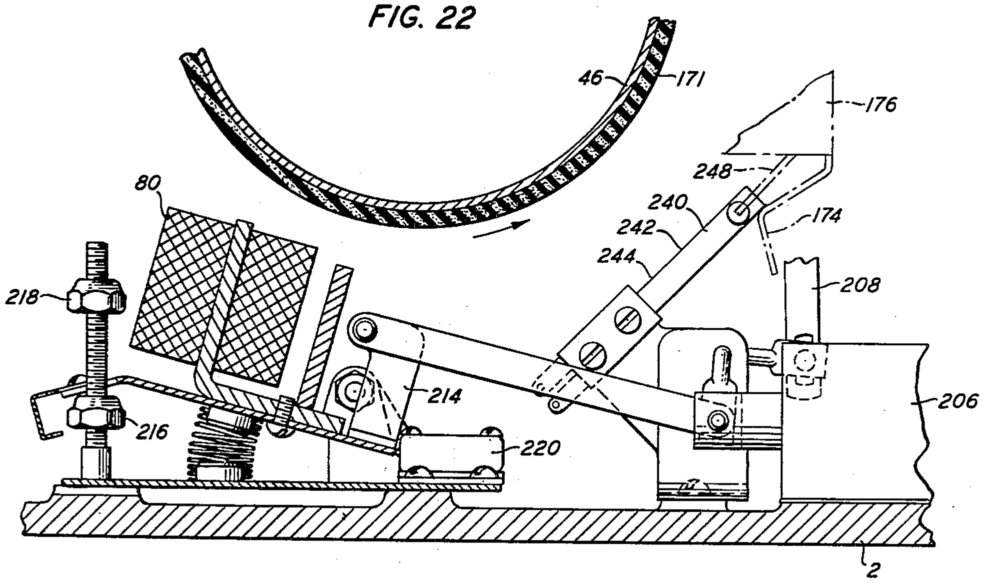
Fig. 22 is a sectional view taken on the line 22—22 of Fig. 5 showing the talk-in erase coil mechanism in the non-operated position.
Figure 23:
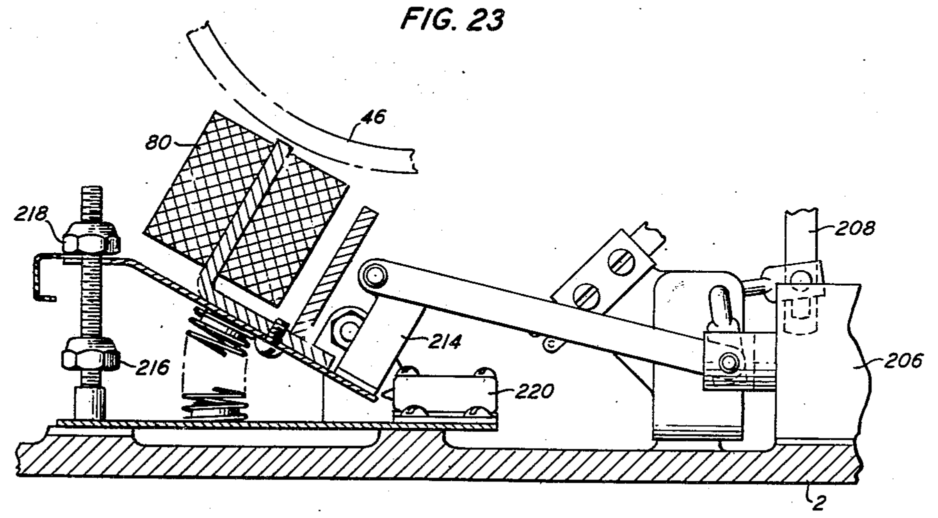
Fig. 23 is a sectional view showing the talk-in erase coil mechanism in the operated position.
Figure 25:
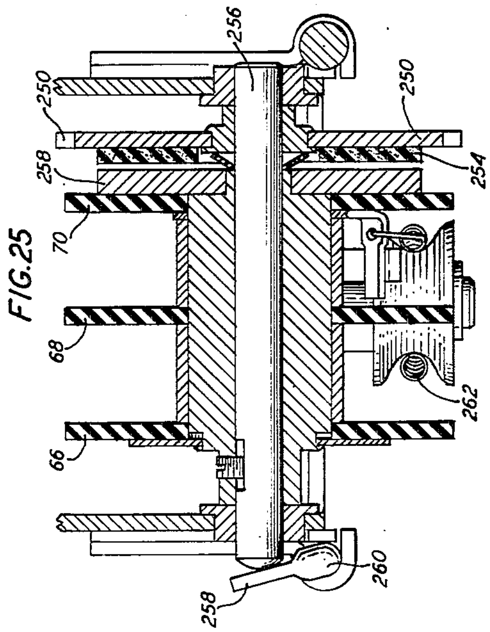
Fig. 25 is a sectional view taken on the line 25—25 of Fig. 24.

Erasing of the incoming messages is accomplished by means of 60-cycle current in a manner similar to that used for the talk-out drum 44. The core of erase coil 80 is approximately the length of the record area, is mounted on the pivoted arm 214 and is permitted to move between the stops 216 and 218. It is actuated by the solenoid 206, as will be explained hereinafter. The 60-cycle current is turned on and off by the switch 220 which is actuated by the pivoted arm 214 (Figs. 22 and 23). Since the talk-in message drum 46 is not always stopped at the same angular position, it is not feasible to have the erase cycle timed directly by the drum. The timing is done by cam 66 and relay 224, releasing relay 230 and solenoid 206 after 3½ seconds or slightly more than one revolution of the talk-in drum 46.

Provision is made for employing an external recorder 238 in place of the talk-in drum 46 to record more messages or messages longer than the maximum time of 30 seconds available on drum 46. Switches 240, 242 and 244 which control the operation of external recorder 238 are located beyond the end of the normal travel of the talk-in transducer carriage 52. In order to operate these switches the stop 246, which defines the end of the normal travel of carriage 52, is detached from carriage 52 and the scanning knob 20 is pushed in and turned all the way to the right. Switches 240, 242 and 244 are actuated by the tail 248 on carriage 52.

Various timing functions are performed by the cams 66, 68 and 70 which are driven when talk-out drum 44 rotates, and cams 72, 74 and 76 which are driven when talk-in drum 46 rotates. Gear 250 which is driven continuously by gear 252 on the main drive shaft 102 provides continuous drive to the clutch 254 mounted on the cam shaft 256. Clutch 254 which connects the cams 66, 68 and 70 to the driving gears 250 and 252 on engaging clutch plate 258 is actuated by the lever 260 operated by solenoid 114, which also releases the stop pawl 116 on the talk-out drum 44. Consequently these cams start to rotate as soon as drum 44 starts to rotate. As the cams rotate they operate their respective contact springs and also wind up the return spring 262. At the end of the talk-out message, solenoid 114 is released, releasing clutch 254 and allowing cams 66, 68 and 70 to be returned to their initial inoperative position by the spring 262. The other end of spring 262 is attached to cams 72, 74 and 76 and thus serves to return either set of cams to their initial position. Similarly, cams 72, 74 and 76 are driven through clutch 264, clutch plate 265 and gears 266 and 268 by lever 270 operated by solenoid 166 at the same time solenoid 166 operates the talk-in drum release pawl 168.

Figure 31:
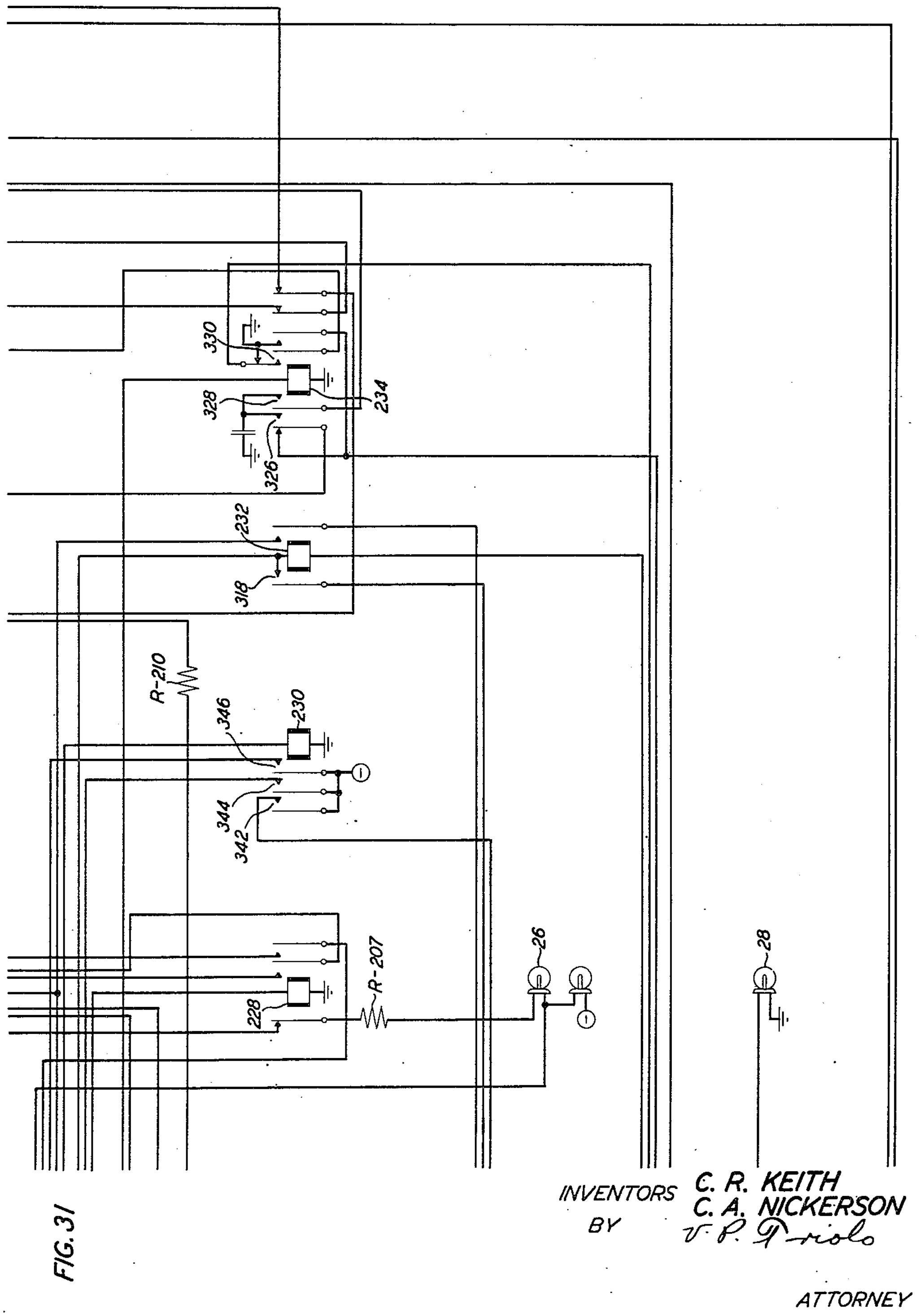

In order to change from one function to another, these functions being designated on the front panel 8 as announcement-dictate, announcement-check, message playback and automatic answer, it is necessary to effect a number of changes in connections. These are accomplished by the slide switches 82 and 84 (Fig. 3) manipulated by the function knob 10. A bevel gear 86 on the knob shaft engages a similar bevel gear 88 (Fig. 4) on a rod 90 extending to the right side of the machine behind the front panel. On rod 90 is a plate 92 carrying a pin 94 which engages in a pivoted T arm 96 in a manner to push the slider of one switch in and the other slider out. Flat bars on the slides engage spring contact clips to make or break circuits as required. These contacts make up switches 272 to 288 (Fig. 31).

Figure 30:
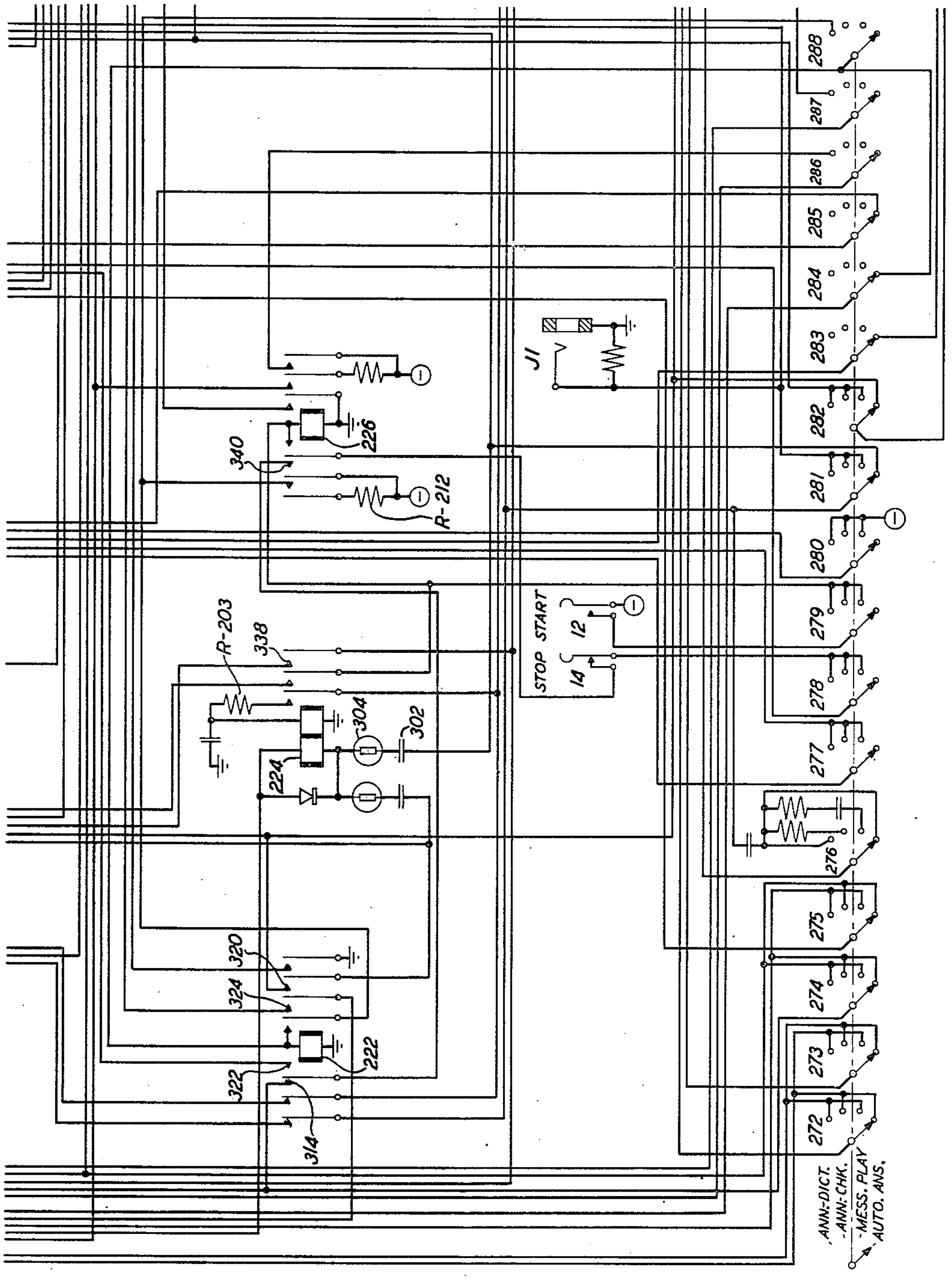

A single speech amplifier consisting of tubes V1, V2 and V3 is used for recording and reproducing both incoming and outgoing messages. Associated with the speech amplifier are the automatic volume control amplifier V4, the recording bias oscillator V5 and a "beep" tone amplifier V6 (Fig. 30). When recording, audio output from V3 is combined with the high frequency bias from V5 and connected to one of the electromagnetic transducers 50 and 54 by way of R–112, T3, relay 234 and switch 272.

Bias oscillator V5 is designed to operate at a frequency of about 13,000 cycles per second. When the speech amplifier is used for reproducing sound from either record medium 106 or 171, relay 234 is not operated and the filaments of V4 and V5 are shunted by the resistor R–117. This reduces the filament current in these tubes to about one-third of normal and eliminates high frequency bias and automatic volume control while reproducing either the talk-out or talk-in message.

Automatic volume control is used during recording of both the talk-out and talk-in messages. The automatic volume control circuit is disabled during the transmission of "beep" tones (while recording talk-in messages) by means of the cam 74 which energizes the "beep" tone amplifier V6.

Signal or "beep" tones are obtained from the tone generator 290, the rotor 292 of which is mounted on the shaft of motor 30. The rotor 292 forms a path of variable magnetic reluctance between two pole pieces connected by a permanent magnet and surrounded by a coil of wire. As the rotor turns the variation of magnetic flux induces an alternating voltage in the coil at a frequency of 1,400 cycles. The comparatively low level from tone generator 290 is amplifier by V6 before transmission on the telephone line. Transformer T2 serves as an output transformer for V6 as well as an isolation transformer. The "beep" tone level is controlled by resistors R–204 and R–205. The level of the first three beeps (two at the beginning of the talk-in message and the first of the two final warning tones) is set by the voltage dividers R–204 and R–205 to give a level of about —10 decibels (as referred to one milliwatt) on the line. Cam 76 operates at the same time as the last lobe on cam 74 to increase the level of the last "beep" to about —5 decibels (as referred to one milliwatt). Plate current is connected to V6 by switch 283 only in the answer position of the function switch knob.

Direct current for the amplifier, relays, solenoids and lamps is obtained from rectifiers 294 and 296 connected to separate windings of the power transformer T4. Rectifier 294 supplies 48 volts for the signal lamps, solenoids and relays. This power is on continuously (when the on-off switch is on) in order that the signal lamps and relays may be immediately available for use. Current for operating relay 232, the "calling party disconnect" relay, is obtained from the central office battery. Rectifier 296 supplies 75 volts for the amplifier only when the machine is in operation (relay 228 operated).

The circuits for controlling the various functions of applicants' apparatus which are described hereinafter are described in greater detail in the application for patent by L. B. Cooke and C. R. Keith filed concurrently with the present application.

CONTROL CIRCUITS

*Announcement-dictate*

With the on-off switch 16 on and the function switch knob 10 at announcement-dictate the ready lamp 26 lights through switch 16, resistor R–207, relay 228 and switch 182. When start switch 12 is momentarily pressed relay 226 operates and locks through the stop switch 14, switch 186, switch 278, switch 136 and resistor R–211. Relay 226 operates relay 228, starting the motor 30, applying amplifier power and extinguishing ready lamp 26. Relay 226 operates solenoid 144, the announcement erase solenoid through switch 286 and solenoid 144 moves the erase coil 78 up to the talk-out drum 44 and releases the adjustable limit switch holding mechanism 142 which allows switch 136 to drop back to the minimum announcement position. Erase current is supplied through switch 160. Relay 226 operates relay 222 through resistor R–212 and switch 288. Relay 222 operates solenoid 114 through switches 242 and 275 starting the drum and cam rotation. Relay 222 operates relay 234, starting the bias oscillator and activating the automatic volume control circuits. Relay 234 connects the talk-out transducer 50 to the amplifier output through switch 272, and connects the telephone set to the amplifier input through transformer T2, switches 16, 281, 282, 276 and resistors R–119 and R–120.

After one drum revolution, about 3 seconds, the mechanical trip mechanism comprising the pin 162 and the latch 164 drops erase coil 78 and erase current is cut off by switch 160. Approximately one-half second later, the dictate lamp 28 lights through switch 287, switch 300 operated by cam 70 and resistor R–206. The talk-out message is recorded on drum 44. During the recording of the message the adjustable limit switch 136 is moved physically by the transducer carriage 48.

At the end of the talk-out message, the subscriber operates the stop switch 14 momentarily. Relay 226 releases, releasing solenoid 144 and thereby clamping the adjustable limit switch 136 by means of the pad 142 in a position corresponding to the end of the talk-out message. The transducer carriage 48 and the cams 66, 68 and 70 return to standby position. Relay 228, however, remains energized through switch 118 until the drum 44 is indexed because stwitch 118 is held closed by the clutch pawl 116 until the indexing takes place.

If the stop switch 14 is not operated by the subscriber, the adjustable limit switch 136 will operate at the limit of its travel (30 seconds) and release relay 226.

The telephone answering device is restored to standby and the ready lamp 26 is lighted.

*Announcement-check*

With the on-off switch 16 in the on position and the function switch knob 10 at announcement-check, the ready lamp 26 is lighted through switch 16, resistor R–207, relay 228 and switches 182 and 280. When start switch 12 is momentarily operated relay 226 operates and locks up through stop switch 14, switch 186, switch 278, adjustable limit switch 136 and resistor R–211. Relay 226 operates relay 228, starting motor 30, applying power to the amplifier and extinguishing the ready lamp 26. Relay 226 also operates the talk-out drum clutch solenoid 114 through relay 222 and switch 274.

The talk-out transducer 50 is connected to the amplifier input through switch 273 and released relay 234. The amplifier output is connected to the telephone set through transformer T1, released relay 234, transformer T2, switches 276, 281, 282 and 16. Cams 66, 68 and 70 rotate but perform no operating functions.

At the end of the talk-out message the adjustable limit switch 136 operates, releasing relay 226 and solenoid 114. The transducer carriage 48 and the cams 66, 68 and 70 return to standby positions. If stop switch 14 is operated before switch 136 operates, relay 226 is immediately released. Relay 228 will remain energized through switch 118 until the talk-out drum is indexed, as explained in connection with the previously described announcement-dictate function, whereupon relay 228 is released and the ready lamp 26 is lighted.

*Message playback*

With the on-off switch 16 in the on position, the function switch knob 10 at message playback and start switch 12 momentarily operated, relay 226 operates and locks through stop switch 14, switches 278, 186 and 136, and resistor R–211. Relay 226 operates relay 228, starting motor 30, energizing the amplifier and extinguishing the ready lamp 26. Relay 226 operates the talk-in drum clutch solenoid 166 through relay 222 and switch 274.

The talk-in drum 46 and cams 72, 74 and 76 rotate. The cam rotation is incidental, no operating function being performed by it, in this case.

The subscriber selects the messages to be played back from talk-in drum 46 with the scanning knob 20 which must be pushed inward before it can be turned. The indicator dial 22 remains stationary and serves as an index for the location of the end of the last recorded incoming message, and the amount of space remaining for recording.

The talk-in transducer 54 is connected to the amplifier input through switch 273 and released relay 234. The amplifier output is connected to the telephone set through transformer T1, released relay 234, transformer T2, switches 276, 281, 282 and 16.

The talk-in drum 46 is stopped by operation of the stop switch 14 or by operation of the limit switch 186. Switch 186 opens when the transducer carriage 52 reaches the end of the record medium 171 on drum 46, and has the same effect as operating switch 14 except that switch 186 remains open until the carriage 52 is manually returned by means of scanning knob 20 to a position other than the end of the record medium 171.

*Automatic answer*

With the on-off switch 16 in the on position, the function switch knob 10 at automatic answer, and the talk-in transducer in position to receive a message other than the first incoming message, switches 182, 184, 186 and 194 are closed; and the ready lamp 26 is lighted through switches 16, resistor R–207, relay 228 and switch 194. (The erasing process involved in the recording of the first incoming message will be described hereinafter.)

Ringing current operates relay 224 through switch 16, condenser 302, thermistor 304, switches 306, 285 and 184 and terminal 308. Relay 224 locks up through resistor R–203, released relay 222, switch 310 of cam 68, switch 312 of cam 72 and switch 194.

Relay 224 operates relay 226 through switch 194. Relay 226 operates relay 228, starting motor 30, energizing the amplifier and extinguishing the ready lamp 26.

Relay 226 operates solenoid 114 through closed contact 314 of released relay 222 and switch 274. The talk-out drum and cams 66, 68 and 70 rotate.

Approximately 3½ seconds after the first ring, the contacts of switch 316 of cam 66 complete termination of the telephone line through switch 16, the winding of relay 232, switch 309 of cam 68, released relay 222, and switch 281.

Relay 232, the "calling party disconnect" relay, operates through switch 281 and holds independent of switch 309 and relay 222 by closing its contact 318.

The talk-out transducer is connected to the amplifier input through switch 273, and released relay 234. The amplifier output is connected to the line through transformer T1, released relay 234, transformer T2, switches 276, 281, 282, 316 and 16. About 1 second after the telephone line is terminated cam 68 opens the contacts of switch 309, making line termination dependent on the holding of relay 232 through its contact 318 and switch 281. Any interruption of central office battery will cause relay 232 to release which would open its contact 318 and cause the telephone answering device to return to standby condition by the release of relay 224 which also releases relay 226 and 228.

If a calling party disconnects during the talk-out message, the open contacts of switch 306 (opened by the operation of solenoid 114) will prevent a new call being received until the talk-out drum is indexed.

At the end of the talk-out message adjustable limit switch 136 operates relay 222 through switch 284. Relay 222 locks up through relay 226, and contact 320 of operated relay 222 takes over the job of holding the telephone line from switch 316 of cam 66. The solenoid 114 is released by the opening of contact 314 of relay 222 due to the operation of relay 222 and the talk-out drum and cams 66, 68 and 70 return to standby or normal positions.

The relay 232 remains under the control of central office battery.

Solenoid 166 is operated through contact 322 closed by the operation of relay 222 and switches 242 and 275. The pawl 168 is disengaged from the slot 170 in talk-in drum 46 and the talk-in drum and cams 72, 74 and 76 start rotating. Relay 234 is operated through contact 324 of relay 222 and switch 160.

The telephone line is connected to the input of the amplifier through switch 16, contact 320 of relay 222, switches 276, 281 and 282, transformer T2 and contacts 326 and 328 of relay 234. The amplifier output is connected to the talk-in transducer 54 through transformer T3, contact 330 of relay 234 and switch 272.

Cam 74 operates switch 331 about one-half second after limit switch 136 operates, thereby connecting the output of power rectifier 296 to the anode of the beep tone amplifier V6 through switch 331 and switch 283. The input to the beep tone amplifier V6 is obtained from the beep tone generator 290 through switch 332 of cam 76. The beep tone level is controlled by the voltage dividers R–205 and R–204, the level of the first three beeps (the first two, 1 second apart, to indicate that the incoming message may be recorded and the third, 25 seconds after the second, to indicate the approach of the end of the maximum recording time) is set to give a level of about —10 decibels (as referred to one milliwatt) on the line. Cam 76 closes switch 334 at the same time as the last of four lobes on cam 74 closes switch 331 to increase the level of the last or second warning beep to about —5 decibels (as referred to one milliwatt). The second beep follows the first beep by about 1 second.

The talk-in message is recorded on talk-in drum 46.

Cam 74 operates switch 331 again about 25 seconds after recording starts, sending the third beep out on the line in the same manner as the first and second beeps.

As described above, cam 76 operates switch 334 and overlaps the fourth operation of switch 331 by cam 74 so that the fourth and last beep is 5 decibels higher in level than the others and follows the third after a 1-second interval.

Switch 312 of cam 72 releases relay 224 about 2½ seconds after the last beep tone is transmitted, allowing a total of 30 seconds recording time including transmission of beep tones.

All relays release, the motor 30 stops, the talk-in drum 46 stops and the cams 72, 74 and 76 return to standby on zero position.

The telephone line is opened and the device is ready to answer another call.

If the telephone line current is interrupted for a short time, as by calling partly disconnect, before the 30 second incoming message recording time has elapsed, relay 232 releases as described heretofore, stopping all motion and restoring the device to standby. Ringing current will be necessary to set the device in motion again.

When the talk-in transducer 54 reaches the point on drum 46 where enough record medium remains for only 35 seconds of message recording, switch 182 is opened by cam 178 and the ready lamp will not light. A short distance further on the talk-in drum, equivalent to 5 seconds of message recording, switch 184 breaks the telephone ground circuit (terminal 308) and a "don't answer" condition is presented to subsequent calls. After the transducer 54 traverses an additional distance, equivalent to 30 seconds of message recording, switch 186 opens. Switch 186 opens the circuit to solenoid 166 so that the transducer 54 cannot run off the end of the drum 46 if the subscriber starts to play back without turning the scanning knob 20 toward zero.

As already indicated, the present invention is designed to function with "calling party disconnect" facilities. At locations where this facility is not available, the machine will operate normally, without internal modifications, but on a fixed time talk-in message basis, i. e., the talk-in message drum will run its full cycle, 30 seconds, whether or not the calling party completes his message and disconnects in less than the allotted time.

*Erasure of talk-in messages*

With the on-off switch 16 in the on position and the function switch knob 10 at automatic answer, the message scanning knob 20 and the indicator dial 22 are turned to the extreme counterclockwise zero position. This operation closes switches 190 and 192.

The ready lamp 26 lights through switch 16, resistor R–207, relay 228, switches 182 and 192. Ringing current on the first call operates relay 224 as described under automatic answer.

Relays 226, 228 and solenoid 114 operate, starting motor 30, energizing the amplifier, starting the talk-out drum 44 and cams 66, 68 and 70 and extinguishing the ready lamp 26.

Relay 230 operates through switch 336 of cam 66, contact 338 of relay 224, switch 190, contact 322 of relay 222 and contact 340 of relay 226. Relay 230 locks through its contact 342 and contact 338 of relay 224.

The solenoid 166 operates through contact 344 of relay 230 to disengage the pawl 168 from the slot 170 in talk-in drum 46 and the talk-in drum and the cams 72, 74 and 76 start rotating.

The talk-in message drum erase solenoid 206 is operated through contact 346 of relay 230 and moves the erase coil 80 up to the record medium 171 on drum 46. The erase current is supplied through switch 220 which closes as erase coil 80 is raised.

The operation of solenoid 206 causes the index contact 198 of switch 194 to return to the talk-in transducer carriage 52 and contact the component of switch 194 disposed on carriage 52, to close switch 194.

After a little more than one revolution of the talk-in message drum 46 (about 3½ seconds) switch 336 of cam 66 releases relay 230 and the erase coil drops back to its normal position. Erase current is cut off by switch 220.

Solenoid 166 releases, the pawl 168 engages the slot 170, the talk-in drum 46 stops and the cams 72, 74 and 76 return to standby on zero position.

Switch 316 of cam 66 terminates the telephone line as the talk-in drum erase cycle ends and the remainder of the cycle proceeds as outlined heretofore for automatic answer.

Switches 190 and 192 open during the erasure of the talk-in drum and the recording of the first talk-in message since the indicator dial 22 is advanced. Consequently, erasure does not occur on subsequent calls.

*Headset playback*

Headset playback service can be made available for the functions announcement-check and message-playback by employing the receiver jack J1 as shown in drawing 31. Jack J1 may be disposed in the right side of the base 2 of the telephone answering device.

It is to be understood that the above-described arrangements are illustrative of the application of the principles of the invention. Other arrangements may be devised by those skilled in the art without departing from the spirit and scope of the invention.

What is claimed is:

1. In an answering and recording system a rotatable answering record drum having an answering message thereon, a rotatable recording record drum, a shaft, said drums being supported by said shaft in such manner as to be free to rotate on said shaft independently, a first movable carriage provided with a transducer for reproducing said answering message, a second movable carriage provided with a transducer for recording on said recording record drum, driving means for rotating said drums and simultaneously moving said carriages, said driving means comprising a motor, a belt drive disposed in such manner as to transmit motion from said motor to said shaft, and clutch means connected directly to said shaft and adjacent each of said drums, each of said clutch means comprising a compliant member disposed in constant frictional engagement with the drum adjacent thereto, detent means on each of said drums, a first pawl engaging the detent means on said answering record drum to arrest the motion of said drum, a second pawl engaging the detent means on said recording record drum to arrest the motion of said drum, a source of power, a first means responsive to power from said source for actuating said first pawl and causing it to become disengaged from said answering record drum, a second means responsive to power from said source for actuating said second pawl and causing it to become disengaged from said recording record drum, means for applying power from said source to said motor to actuate said driving means, and to said first pawl actuating means to permit the compliant clutch member adjacent said answering record drum to transmit rotary motion to said answering record drum, switch means operable by said first carriage at the end of said answering message for cutting off said power from said first pawl actuating means to cause said first pawl to engage said answering record drum and arrest its motion, and for applying power from said source to said second pawl actuating means to permit the compliant clutch member adjacent said recording record drum to transmit rotary motion to said recording record drum.

2. In an answering and recording system a rotatable answering record drum having an answering message thereon, a rotatable recording record drum, a shaft, said drums being supported by said shaft in such manner as to be free to rotate on said shaft independently, a first movable carriage provided with a transducer for reproducing said answering message, a second movable carriage provided with a transducer for recording on said recording record drum, driving means for rotating said drums and simultaneously moving said carriages, said driving means comprising a motor, first and second endless belts, said belts being serially arranged to transmit motion from said motor to said shaft, said first belt being disposed in such manner as to transmit motion from said motor to a flywheel, said second belt being disposed in such manner as to transmit motion from said flywheel to said shaft, and clutch means connected directly to said shaft and adjacent each of said drums, each of said clutch means comprising a compliant member disposed in constant frictional engagement with the drum adjacent thereto, detent means on each of said drums, a first pawl engaging the detent means on said answering record drum to arrest the motion of said drum, a second pawl engaging the detent means on said recording record drum to arrest the motion of said drum, a source of power, a first means responsive to power from said source for actuating said first pawl and causing it to become disengaged from said answering record drum, a second means responsive to power from said source for actuating said second pawl and causing it to become disengaged from said recording record drum, means for applying power from said source to said motor to actuate said driving means, and to said first pawl actuating means to permit the compliant clutch member adjacent said answering record drum to transmit rotary motion to said answering record drum, switch means operable by said first carriage at the end of said answering message for cutting off said power from said first pawl actuating means to cause said first pawl to engage said answering record drum and arrest its motion, and for applying power from said source to said second pawl actuating means to permit the compliant clutch member adjacent said recording record drum to transmit rotary motion to said recording record drum.

3. An answering and recording system in accordance with claim 2 in combination with a telephone line wherein the means for applying power to said motor is actuated by means responsive to ringing current on said telephone line.

4. An answering and recording system in accordance with claim 2 wherein each of said clutch means comprises a collar fixedly connected to said shaft, a plate member slidably connected to said collar, a compliant member disposed between said plate member and the drum adjacent thereto, and a spring member disposed under compression between said collar and said plate member.

5. In an answering and recording system a rotatable answering record drum having an answering message thereon, a shaft, said record drum being supported by said shaft in such manner as to be free to rotate on said shaft, means for rotating said shaft comprising a motor and a belt drive disposed in such manner as to transmit motion from said motor to said shaft, clutch means connected directly to said shaft, said means comprising a compliant member disposed in constant frictional engagement with said record drum, means for obliterating said answering message within one revolution of said drum, said obliterating means being disposed a predetermined distance from said drum and affixed to a pivotally mounted bracket, means for pivoting said bracket and moving said obliterating means a predetermined distance toward said drum, said means comprising an arm detachably connected to said bracket, a source of power, means responsive to power from said source for actuating said arm and energizing said driving means, means for applying power from said source to said driving means and to said arm actuating means to cause said arm to pivot said bracket, means for holding said arm actuating means and said driving means energized for the period of time required to complete a plurality of revolutions of said drum, means for disconnecting said arm from said bracket at the end of one revolution of said drum, said means comprising a spring tensioned latch pivotally mounted on said bracket and adapted on being pivoted to engage said arm and disconnect it from said bracket, and a detent disposed on said drum and adapted to engage said latch and cause it to pivot at the end of substantially one revolution of said drum.

6. In an answering and recording system a rotatable answering record drum having an answering message thereon, a rotatable recording record drum, a shaft, said drums being supported by said shaft in such manner as to be free to rotate on said shaft independently, a first movable carriage provided with a transducer for reproducing said answering message, a second movable carriage provided with a transducer for recording on said recording record drum, driving means for rotating said drums and simultaneously moving said carriages, said driving means comprising a motor, means for transmitting motion from said motor to said shaft, and clutch means connected directly to said shaft and adjacent each of said drums, each of said clutch means comprising a complaint member disposed in constant frictional engagement with the drum adjacent thereto, detent means on each of said drums, a first pawl engaging the detent means on said answering record drum to arrest the motion of said drum, a second pawl engaging the detent means on said recording record drum to arrest the motion of said drum, a source of power, means responsive to power from said source for actuating said first pawl and causing it to become disengaged from said answering record drum, means responsive to power from said source for actuating said second pawl and causing it to become disengaged from said recording record drum, means responsive to power from said source for energizing said motor to actuate said shaft, means for applying power from said source to said motor energizing means and to said first pawl actuating means to permit the compliant clutch member adjacent said answering record drum to transmit rotary motion to said answering record drum, switch means operable by said first carriage at the end of said answering message for cutting off said power from said first pawl actuating means to cause said first pawl to engage said answering record drum and arrest its motion, and for applying power from said source to said second pawl actuating means to permit the compliant clutch member adjacent said recording record drum to transmit rotary motion to said recording record drum, a first current path including said source of power and said motor energizing means, a second current path including said source of power, said motor energizing means and a switch, said current paths being rendered effective by said power applying means, said switch being operable by said first pawl to render said second current path ineffective when said pawl and the detent means on said answering record drum are engaged, said second current path remaining effective as long as said first pawl is disengaged from said detent means on said answering record drum.

7. An answering and recording system in accordance with claim 6 in combination with a telephone line wherein the means for applying power to said motor energizing means and to said pawl actuating means is rendered effective by means responsive to ringing current on said telephone line, and rendered ineffective by means responsive to a time measuring means.

8. An answering and recording system in accordance with claim 6 in combination with a telephone line wherein the means for applying power to said motor energizing means and to said pawl actuating means is rendered effective by means responsive to ringing current on said telephone line, and rendered ineffective by means responsive to a disconnect condition established by the calling party.

9. An answering and recording system in accordance with claim 6 wherein said means for transmitting motion from said motor to said shaft comprises first and second endless belts, said belts being serially arranged, said first belt being disposed in such manner as to transmit motion from said motor to a flywheel, said second belt being disposed in such manner as to transmit motion from said flywheel to said shaft.

10. An answering and recording system in accordance with claim 6 wherein each of said clutch means comprises a collar fixedly connected to said shaft, a plate member slidably connected to said collar, a complaint member disposed between said plate member and the drum adjacent thereto, and a spring member disposed under compression between said collar and said plate member.

References Cited in the file of this patent

UNITED STATES PATENTS

| | | |
|---|---|---|
| 2,250,586 | Lamond | July 29, 1941 |
| 2,374,842 | Shively et al. | May 1, 1945 |
| 2,492,979 | Freer | Jan. 3, 1950 |
| 2,549,548 | Von Zimmerman | Apr. 17, 1951 |